United States Patent [19]

Taylor

[11] Patent Number: 4,845,889
[45] Date of Patent: Jul. 11, 1989

[54] LAWN TRIMMER SHIELD

[76] Inventor: Jess W. Taylor, 7515 Chapman Hwy., Knoxville, Tenn. 37920

[21] Appl. No.: 209,089

[22] Filed: Jun. 20, 1988

[51] Int. Cl.$^4$ ............................................. A01G 13/10
[52] U.S. Cl. ........................................ 47/23; 47/25; 47/47
[58] Field of Search .................. 47/23, 24, 25, 28, 29, 47/30, 31, 32

[56] References Cited

U.S. PATENT DOCUMENTS

| 44,131 | 9/1864 | Whitlock | 47/23 |
| 145,585 | 12/1873 | Neff | 47/23 |
| D. 162,243 | 2/1951 | Simmons | D8/1 |
| 223,093 | 12/1879 | Barnhill et al. | 47/23 |
| 283,837 | 8/1883 | Wallace | 47/23 |
| 404,757 | 6/1889 | Webber | 47/23 |
| 2,782,561 | 2/1957 | Smith | 47/25 |
| 3,826,040 | 7/1974 | Roberts et al. | 47/30 |
| 4,268,992 | 5/1981 | Scharf, Sr. | 47/23 |

FOREIGN PATENT DOCUMENTS 261513 2/1964 Australia .................. 47/33

Primary Examiner—Robert A. Hafer
Assistant Examiner—Lynda M. Cofsky
Attorney, Agent, or Firm—Pitts and Brittian

[57] ABSTRACT

A lawn trimmer shield (10) for protecting trees, plants and the like against damage from being struck by the rotating string (13) of a lawn trimmer/weed cutter (12) is disclosed. The shield (10) comprises two wall sections (14 and 16) of hollow substantially semi-cylindrical shape which are hingably connected via a hinge (17). Each of the wall sections has a chamfered ground engaging edge (26 and 28) which facilitates trimming close to the ground adjacent the shield (10). Handles (30A and 30B) are provided for facilitating installation and removal of the shield (10). Spikes (32A and 32B) are provided proximate the ground engaging edge (26 and 28) for securing the shield (10) close to the ground when it is installed about a tree (11), plant or the like.

7 Claims, 3 Drawing Sheets

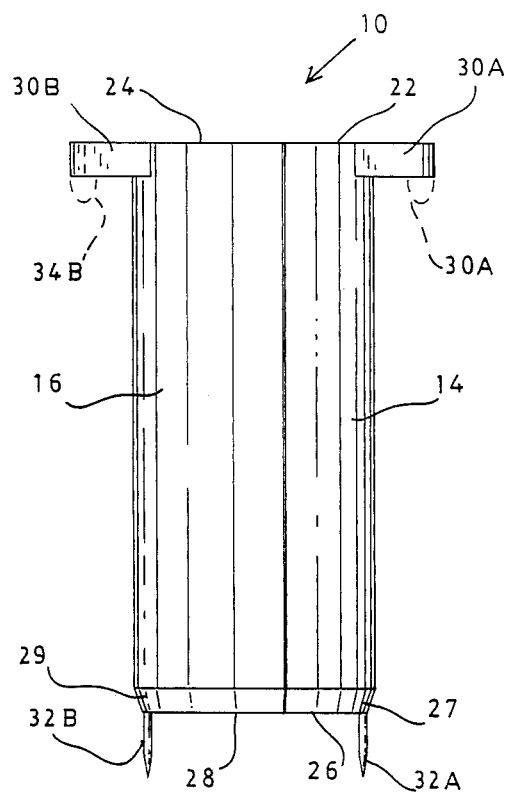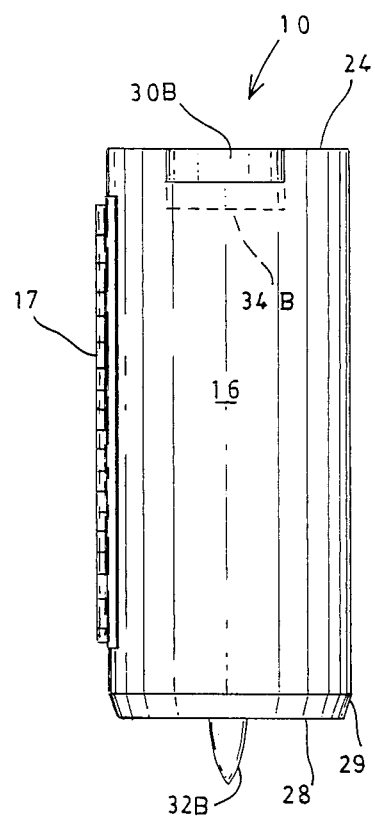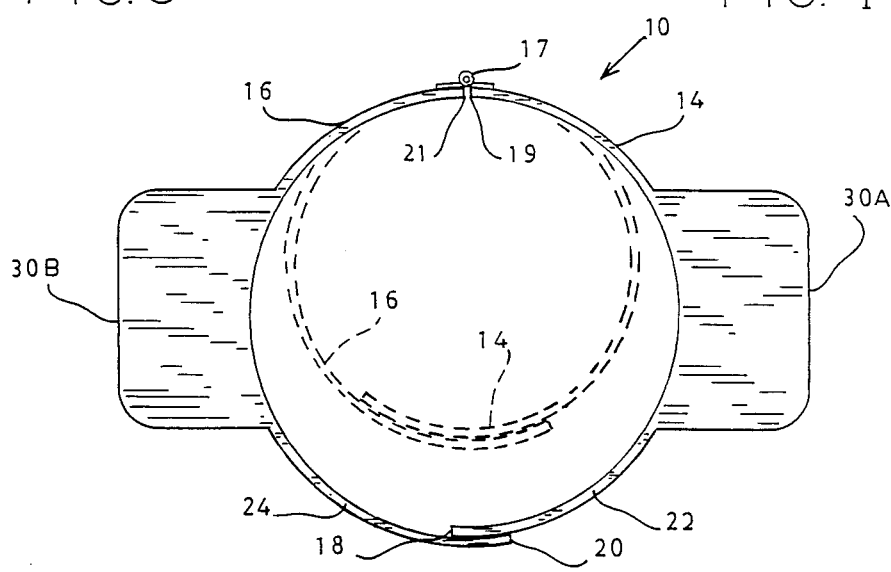

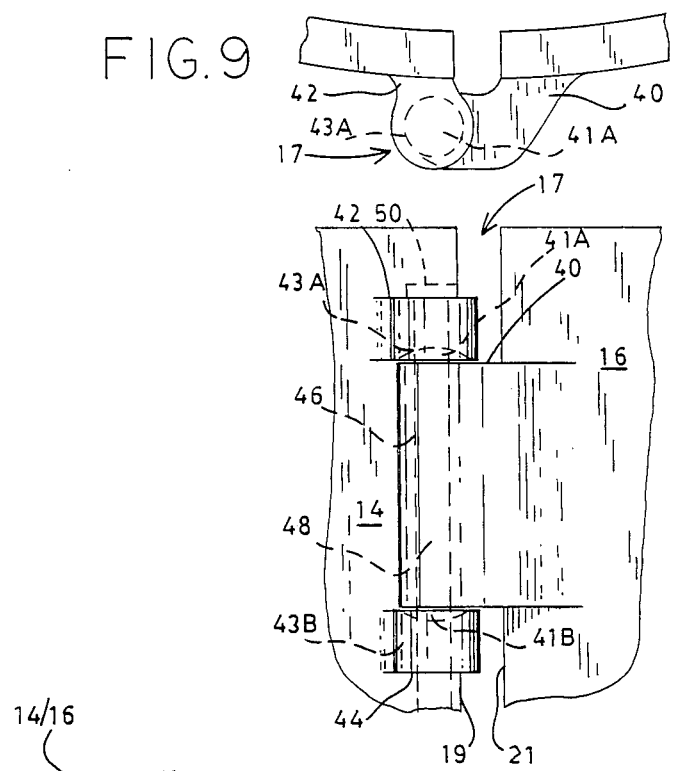
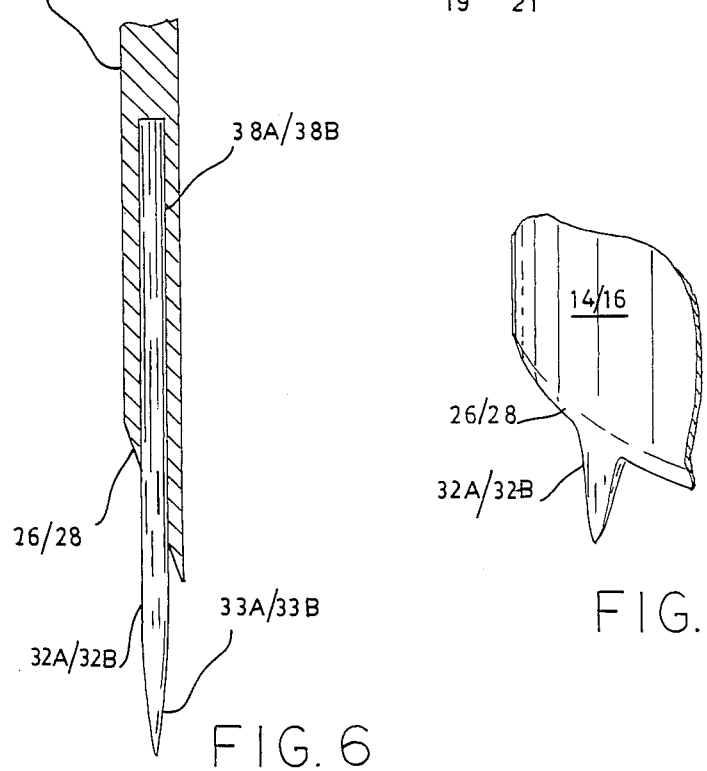

LAWN TRIMMER SHIELD

TECHNICAL FIELD

This invention relates to a lawn trimmer shield for protecting trees, plants and the like against scarring and other damage which may result from being struck by the rotating string of an electric or gas powered grass trimmer/weed cutter.

BACKGROUND ART

Devices which are designed to protect trees, plants and the like against a variety of destructive forces are well known. Such devices have been designed to protect against damage caused by insects, small animals and lawn mowers of conventional design. Conventionally, such devices are of one or two piece design and comprise a hollow box-like or cylindrically shaped device which surrounds the stem of the plant or the trunk of the tree nearest the ground. Most have been designed for permanent or semi-permanent installation to protect against damage by insects. In one device, a tree protector is provided with a built-in watering system and a substantially flat base which extends outwardly from the base of the tree, thereby permitting a conventional lawn mower to be maneuvered close to the tree. These and other known devices are included in the following U.S. Pat. Nos. 44,131; 223,093; 283,837; 404,757; Des. 162,243; 3,826,040; and 4,268,992.

None of these prior art patents specifically address the problems posed by the advent of the powered rotating string type lawn and weed trimmers such as those marketed under the tradenames WEEDEATER® and WEED-WHACKER®. These trimmers utilize a string of nylon or other synthetic material which rotates at high speed to trim grass or to cut weeds near the ground. Unfortunately, the rotating string of these trimmers can cause scarring of small trees and more severe damage to saplings and other decorative plantings.

It is an object of the present invention to provide a lawn trimmer shield which protects trees, plants and the like against damage from being struck by the string of a rotating string type grass trimmer/weed cutter.

Another object of the present invention is to provide a lawn trimmer shield which permits grass trimming and weed cutting very close to a tree plant or the like while still protecting such tree, etc.

It is also an object of the present invention to provide a lawn trimmer shield which facilitates the trimming of grass and cutting of weeds very close to the ground right up to the ground engaging edge of such shield.

It is a further object of the present invention to provide a lawn trimmer shield which is easily installed about a tree, plant or the like as well as being easily removed for reinstallation about another tree, etc. or for storage.

Another object of the present invention is to provide a lawn trimmer shield which can be installed about trees or other decorative plantings of varying size or diameter.

Yet another object of the present invention is to provide a lawn trimmer shield which is inexpensive to manufacture.

DISCLOSURE OF THE INVENTION

Other objects and advantages will be accomplished by the present invention which provides a lawn trimmer shield for protecting trees, plants and the like against damage from being struck by the rotating string of a lawn trimmer/weed cutter. The lawn trimmer shield of the present invention comprises two wall sections of hollow semi-cylindrical shape which are hingably connected along a longitudinal, i.e. vertical, edge such that, when the two wall sections are closed together about the hinged edges, they form a hollow substantially cylindrically shaped device which may be installed around a tree or other decorative planting near the ground to protect such tree/planting from damage which would be caused by being struck by the rotating string of a lawn trimmer/weed cutter. Handle means are provided proximate each wall section for facilitating installation and removal of the device about a tree or other planting. Each wall section has a chamfered ground engaging edge which facilitates trimming close to the ground proximate such edge with a rotating string type lawn trimmer/weed cutter. Spike means are also provided proximate the ground engaging edges of each wall section for securing the device firmly against the ground.

BRIEF DESCRIPTION OF THE DRAWINGS

The above-mentioned features of the invention will become more clearly understood from the following detailed description of the invention read together with the drawings in which:

FIG. 3 illustrates a front elevation view of a lawn trimmer shield of the present invention.

FIG. 4 illustrates a side elevation view of a lawn trimmer shield of the present invention.

FIG. 5 illustrates a top view of a lawn trimmer shield of the present invention.

FIG. 6 illustrates a partial side elevation view, partially in section, depicting the spike means of a lawn trimmer shield of the present invention.

FIG. 7 illustrates a partial perspective view of an alternate embodiment of the spike means of the lawn trimmer shield of the present invention.

FIG. 8 illustrates a partial rear elevation view depicting one section of the hinge means of the lawn trimmer shield of the present invention.

FIG. 9 illustrates a partial top view depicting the hinge means of the lawn trimmer shield of the present invention.

BEST MODE FOR CARRYING OUT THE INVENTION

Figure 1:
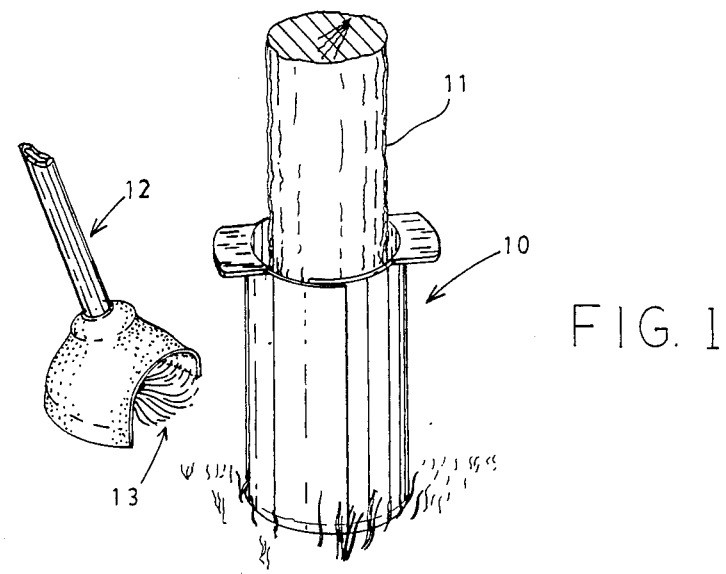
FIG. 1 illustrates a perspective view of a lawn trimmer shield of the present invention as it is normally installed about a tree.

A lawn trimmer shield incorporating various features of the invention is shown generally at 10 in FIGS. 1 through 5. In FIG. 1, the shield 10 is shown as it is normally received about a tree 11 or other decorative planting to protect such tree or other planting from damage which would be caused if it were struck by the rotating string 13 of a lawn trimmer/weed cutter 12.

Figure 2:
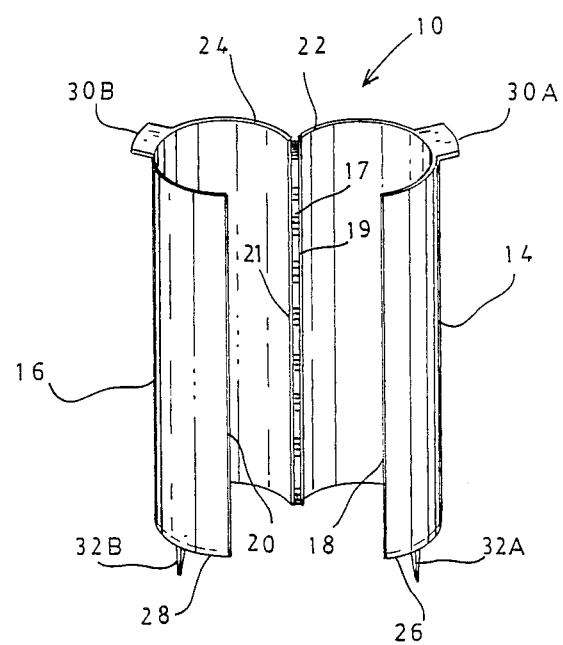
FIG. 2 illustrates a perspective view of a lawn trimmer shield of the present invention, shown partially open.

Referring to FIG. 2, the shield 10 includes first and second wall sections 14 and 16 of hollow substantially semi-cylindrical shape. The wall sections 14 and 16 each define first longitudinal, i.e. vertical, edges 18 and 20, respectively, second longitudinal edges 19 and 21, respectively, top edges 22 and 24, respectively, and ground engaging edges 26 and 28, respectively. The first wall section 14 is hingably connected to the second wall section 16 along their second longitudinal edges 19 and 21, respectively, via hinge means 17. Thus, when the sections 14 and 16 are closed together about the hinge means 17, they form a shield of hollow substantially cylindrical shape, as illustrated in the figures. The wall sections 14 and 16 each include handle means 30A and 30B, respectively, located proximate their top edges 22 and 24, respectively, for facilitating installation of the shield 10 about a tree or other planting and removal therefrom. Each section 14 and 16 also has spike means 32A and 32B, respectively, fixedly attached thereto proximate the ground engaging edges 26 and 28, respectively, for securing the shield 10 against the ground when it is installed about a tree or other planting as illustrated in FIG. 1.

Referring now to FIGS. 3 and 4, front and side elevation views of the shield 10 are illustrated. From these figures it can be seen that, in the preferred embodiment, the ground engaging edges 26 and 28 of the wall sections 14 and 16, respectively, define chamfered surfaces 27 and 29, respectively. When the shield 10 is installed as illustrated in FIG. 1, the chamfered surfaces 27 and 29 will deflect the rotating string 13 of the trimmer 12 downward toward the ground when the trimmer 12 is moved close to the shield 10 along the ground, thereby causing grass and/or weeds next to the shield 10 to be cut off very close to the ground. Still referring to FIGS. 3 and 4, in the preferred embodiment, the handle means 30A and 30B are an integrally formed part of the wall sections 14 and 16, respectively, and are located proximate the top edges 22 and 24, respectively. In an alternate embodiment, the handles 30A and 30B define detents, shown by the dotted lines at 34A and 34B, respectively, to better facilitate a user's gripping of the handle with the user's fingers.

Referring now to FIG. 5, it can be seen that the first wall section 14 is dimensioned such that it is partially overlapped by the second wall section 16 proximate their first longitudinal edges 18 and 20, respectively, when the sections 14 and 16 are closed together about the hinge 17. As illustrated by the dotted lines in FIG. 5, the overlapping of the sections 14 and 16 can be varied to accommodate a range of sizes of trees or other plantings about which the shield 10 is installed.

Referring now to FIG. 6, in the preferred embodiment spike means comprise spikes 32A and 32B, preferably made of metal, which are received within apertures 38A and 38B in the chamfered ground engaging edges 26 and 28, respectively, of the first and second wall sections 14 and 16, respectively. As apparent in the figure, the apertures 38A and 38B are vertically disposed and the spikes 32A and 32B, respectively, are received therein such that the pointed end portions 33A and 33B of the spikes 32A and 32B are downwardly disposed for engaging the ground. An alternate embodiment of the spike means is shown in FIG. 7 wherein the spike means 32A' and 32B' comprise spikes which are an integral part of the wall sections 14 and 16, respectively, and are integrally molded therein proximate the chamfered ground engaging edges 26 and 28, respectively.

Referring now to FIGS. 8 and 9, hinge means are shown generally at 17. The hinge means 17 includes a plurality of first hinge members 40 which are spaced along the second longitudinal edge 21 of the second wall section 16 and a plurality of second and third hinge members 42 and 44 which are spaced along the second longitudinal edge 19 of the first wall section 14. Each first hinge member 40 is provided with detents 41A and 41B which are received in indentations 43A and 43B, respectively, defined in the second and third hinge members 42 and 44, respectively, whereby each first hinge member 40 cooperates with corresponding second and third hinge members 42 and 44, respectively, to form a pivotal connection between the first and second wall sections 14 and 16. In an alternate embodiment, the cooperating detents 41A and 41B and indentations 43A and 43B are eliminated and replaced by an aperture 46 which extends through each hinge member for closely receiving a pin 48 about which the hinge members pivot. The pin 48 is provided with a head 50 for facilitating insertion of the pin through the plurality of apertures 46 to align the hinge members. It will be appreciated that, in this embodiment which is illustrated by the dotted lines in FIG. 8, a single pin 48 can extend through all of the sets of cooperating first, second, and third hinge members, of which there are a plurality, thereby aligning all such sets of cooperating hinge members.

From the foregoing detailed description, it will be recognized that a lawn trimmer shield has been provided which may be installed about a range of sizes of trees, plants or the like to protect such trees or plantings from damage which would be caused by being struck by the rotating string of a lawn trimmer/weed cutter. In the preferred embodiment, spike means are provided which can be forced into the ground to secure the ground engaging edge close to the ground. Handle means are provided to facilitate forcing such spikes into the ground as well as pulling the stakes out of the ground, thereby providing a lawn trimmer shield which may be installed or moved from one tree or other planting to another with ease. A chamfered ground engaging edge is provided which facilitates the cutting of grass and weeds very close to the ground next to the shield.

While a preferred embodiment has been shown and described, it will be understood that it is not intended to limit the invention to such disclosure, but rather it is intended to cover all modifications and alternate constructions falling within the spirit and the scope of the invention as defined in the appended claims.

I claim:

1. A lawn trimmer shield for protecting trees, paints and the like against scarring and other damage caused by being struck by the rotating string of a grass trimmer/weed cutter, comprising:

first and second hingedly connected sections, each of said sections comprising a wall of hollow substantially semi-cylindrical shape, each said wall defining first and second longitudinal, i.e. substantially vertical, edges, a top edge and a chamfered ground engaging edge, whereby said rotating string is deflected downward to permit close trimming when said rotating string strikes said chamfered ground engaging edge;

hinge means proximate said first longitudinal edge of each said section, whereby said first section is hingably attached to said second section;

handle means proximate said top edge of each said section; and at least one spike means fixedly attached to said wall proximate said ground engaging edge of each said section.

2. The lawm trimmer shield of claim 1 wherein said handle means comprises said top edge of each said section defining a flange-like member for gripping and deploying said lawn trimmer shield.

3. The lawn trimmer shield of claim 1 wherein said handle means comprises each said section defining a handle integrally molded into said wall.

4. The lawn trimmer shield of claim 1 wherein said spike means comprises each said section defining a spike member integrally molded into said wall proximate said ground engaging edge and extending outwardly, i.e. downward, from said ground engaging edge.

5. The lawn trimmer shield of claim 1 wherein said wall of said first section has a radius which exceeds the radius of said wall of said second section by at least the thickness of said walls whereby said first section overlaps said second section when said sections are closed together around a tree, plant or the like which is of a smaller radius than either of said sections.

6. A lawn trimmer shield for protecting trees, plants and the like against scarring and other damage caused by being struck by the rotating string of a grass trimmer/weed cutter, comprising:
   first and second hingably connected sections, each of said sections comprising a wall of hollow substantially semi-cylindrical shape, each said wall defining first and second longitudinal, i.e. substantially vertical, edges, a top edge and a chamfered ground engaging edge whereby said rotating string is deflected downward to permit close trimming when said rotating string strikes said chamfered ground engaging edge, said wall of said first section having a radius which exceeds the radius of said second section by at least the thickness of said walls whereby said first section overlaps said second section when said sections are closed together around a tree, plant or the like which is of a smaller radius than either of said sections;
   hinge means proximate said first longitudinal edge of each said section, whereby said first section is hingably attached to said second section;
   handle means proximate said top edge of each said section, said handle means comrising said top edge of each said section defining a flange-like member which is integrally molded into said section; and
   at least one spike means fixedly attached to said wall proximate said ground engaging edge of each said section.

7. The lawn trimmer shield of claim 6 wherein said spike means comprises each said section defining a spike member integrally molded into said wall proximate said ground engaging edge and extending outwardly, i.e. downward, from said ground engaging edge.

* * * * *